July 21, 1970  E. J. HASTEN, JR  3,521,570

RETAINING KEY FOR PEDESTAL SIDE FRAMES

Filed Aug. 21, 1968  3 Sheets-Sheet 1

INVENTOR
ERWIN J. HASTEN JR.

BY

ATTORNEYS.

INVENTOR
ERWIN J. HASTEN JR.

BY

ATTORNEYS.

July 21, 1970  E. J. HASTEN, JR  3,521,570
RETAINING KEY FOR PEDESTAL SIDE FRAMES
Filed Aug. 21, 1968  3 Sheets-Sheet 3
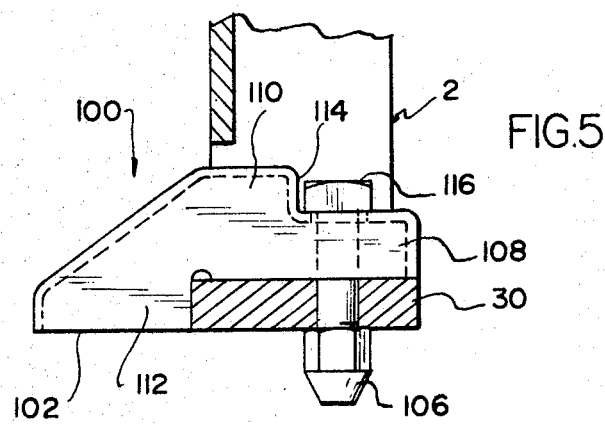
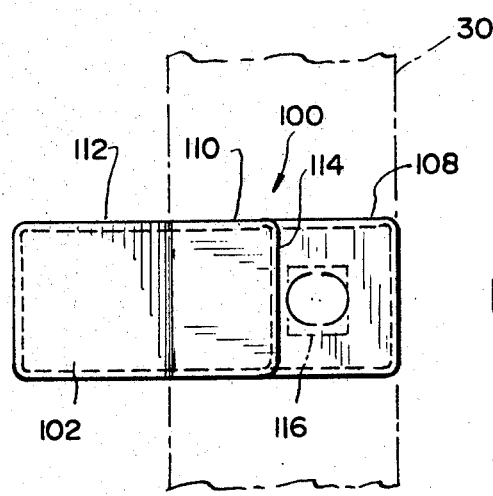
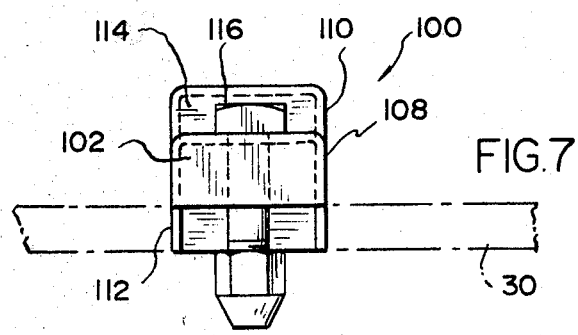
INVENTOR
ERWIN J. HASTEN JR.
BY *Petherbridge, O'Neill & Aubel*
ATTORNEYS.

United States Patent Office 3,521,570
Patented July 21, 1970

3,521,570
RETAINING KEY FOR PEDESTAL SIDE FRAMES
Erwin J. Hasten, Jr., 7 S. Dearborn St.,
Chicago, Ill. 60603
Continuation-in-part of application Ser. No. 618,045,
Feb. 23, 1967. This application Aug. 21, 1968, Ser.
No. 766,658
Int. Cl. B61f 5/26, 15/02
U.S. Cl. 105—221                                          18 Claims

ABSTRACT OF THE DISCLOSURE

A light-weight, high-strength frame key formed from a hollow box member and used primarily in connection with a vehicular pedestal type sideframe. The frame key is designed to prevent the accidental dislodgment of an unsupported wheel, axle and bearing assembly from the pedestal type side frame now being used with frequency on railroad cars. The construction of the key is such that it can be bolted to existing side frames in a manner which will lock the head and nut of the bolt against relative rotation during periods of use of the side frame.

---

This application is a continuation-in-part of my copending application Ser. No. 618,045, filed Feb. 23, 1967, for "Frame Key for Pedestal Side Frame, now abandoned."

The railroad industry has adopted and has been using freight cars with pedestal-type side frames for a number of years. These freight cars have generally featured car supporting trucks which are directly mounted upon bearing, axle and wheel assemblies without any form of vertical support for the bearing and axle assembly. While this manner of assembly and use of pedestal-type freight cars has been found to have many important advantages, the arrangement has one serious shortcoming. In the event of a derailment of the freight car of the accidental relative vertical movement of the side frame with respect to the bearing, wheel and axle assembly, freight cars have been known to become completely separated from their wheel assemblies. This occurs primarily when the truck and side frame of the car are accidentally elevated or the wheel assembly drops abruptly. The sudden relative movement of the wheel assembly and side frame can then cause the separation of the unsupported bearing, axle and wheel assembly from the pedestal adapter and thereby from the freight car.

To prevent this separation of freight car and wheel assembly, retainer devices such as are shown in the patent to Orr 2,234,413 have been developed. These heavyweight iron or steel retainer devices are designed to be installed on the side frame of a freight car after the truck thereof has been placed upon its respective wheel assembly. Such a retainer device is then bolted to the side frame of the truck. The location of these side frame bolting sites is ordinarily cramped and difficult to reach, making maximum tightening of the retainer difficult to achieve.

Past attempts at retaining separated wheel assemblies and trucks have been directed to the utilization of solid heavyweight frame keys or retainers. These devices are ordinarily made to project generally laterally below the axle, bearing and wheel assembly upon which the truck is supported. one of the chief shortcomings resulting from the use of these solid heavyweight devices lies in a design which permits the exertion of almost all of the stress, which is initially applied to the key or retainer during a separation, upon the bolt securing the key to the side frame. This stress has been found to cause the shearing of the locking bolt during derailment with a consequent total separation of the wheel, axle and bearing assembly from the truck of the freight car.

The frame key of the invention utilizes a box or hollow construction, which is considerably lighter in weight than the solid devices previously in use and therefore easier to handle. The hollow key also develops higher strength with the weight reduction by distribution of its metal surfaces farther from the neutral axis of the unit than is the case with solid metal keys or retainers.

The construction of the frame key of the invention is such that portions of the key straddle the standing mounting element or lug provided on the side frame in order to exert stress loads primarily upon the mounting element and not upon the bolts used to secure the key to the frame as in the prior art devices.

To prevent the loosening of the frame key securement bolts during operation of a freight car, the key of the invention is provided with locking tabs adjacent the bolt receiving openings in the key and in an alternate embodiment by an integrally formed bolt abutment. The tabs are formed adjacent the bolt opening at the head end of the bolt. They engage the bolt head in a manner preventing its rotation. Another tab element is disposed adjacent the opposite key opening but in a position which will not interfere with the maximum tightening of a nut threaded onto the end of the bolt. When this nut has been tightened to rigidly secure the key to the frame, the tab is bent back against and into engagement with the nut to prevent any loosening of the bolt through the vibration or jarring of the freight car. The bolt abutment on the modified key embodiment is formed to engage a portion of the bolt head to prevent its rotation.

The key of the invention thereby provides a lightweight high strength retaining means for a wheel, axle and bearing assembly which will serve reliably during extended use in preventing the complete separation of the assembly from the side frame of the truck. Also, by bending back the bent tab, the key of the invention can be readily removed to permit removal, servicing or replacement of the wheel assembly.

Various objects and advantages of the invention shall hereinafter become more fully apparent from the following description of the drawings illustrating presently preferred embodiments thereof and wherein:

FIG. 5 is an enlarged fragmentary side elevational view of a portion of the common railroad freight car truck illustrating a modified embodiment of the side frame key of the present invention in operative relationship therewith;

FIG. 6 is a top plan view of the key illustrated in FIG. 5; and

FIG. 7 is an end elevation of the key illustrated in FIG. 5.

Figure 1:
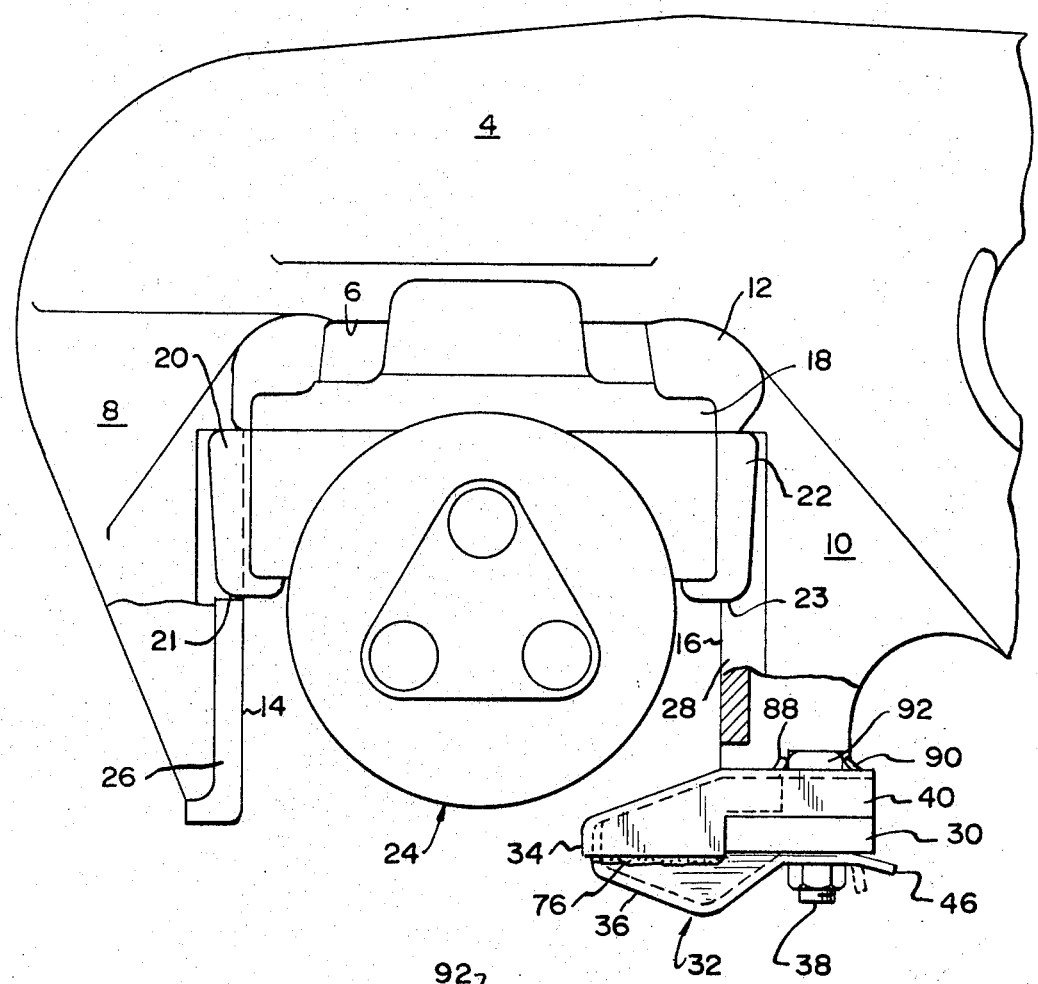
FIG. 1 is a fragmentary side elevational view of a common railroad freight car truck incorporating the side frame key of the present invention.

FIG. 1 illustartes a fregmentary portion of a wide pedestal-type side frame, generally designated 2, which is a type in common use in the railroad industry as an element of a freight car supporting truck. The portion of the pedestal side frame shown includes a body portion 4 which has a lower generally horizontally extending bottom wall 6. The generally horizontally extending bottom wall 6 opens downwardly and forms in conjunction with outer leg 8 and inner leg 10 of the side frame a bearing receiving opening or jaw generally designated 12. This bearing opening, therefore, is defined by the inner facing wall 14 of leg 8 and the inner facing wall 16 of inner leg 10 in conjunction with bottom wall 6.

A wide bearing adapter or saddle 18 is illustrated in FIG. 1 as having a pair of adapter lugs 20 and 22 which are mounted in engagement with end keys 21 and 23 of outer leg 8 and inner leg 10 respectively. A common cartridge journal bearing, which can be of either the roller or solid types, generally designated 24, acts with the wheel and axle to support the weight of the pedestal side frame 2 through the wide adapter or saddle 18.

As can be seen in FIG. 1, the casting which comprises the leg portions 8 and 10 of the side frame include flanges which extend in a directly generally normal to the plane of the longitudinal axis of the frame. The flange 26 of outer leg 8 extends to the bottom of the leg and serves in the positioning or keying of the lug 20 to the frame. The flange 28, on the other hand, serves a similar function but extends to a point spaced from the bottom and inner leg 10. Inner leg 10 is also provided with an integrally cast flange or lug 30 which is used as a base for mounting and securing a side frame key or retainer, generally designated 32, to the side frame. The flange 30 of the inner leg, as shown in FIG. 1, extends generally horizontally and outwardly from the leg in a direction generally normal to the longitudinal axis of the side frame.

The frame key or retainer 32 illustarted in FIGS. 1–4 is shown to be fabricated from two parts, a top part 34 and a bottom part 36. The frame key is shown to be secured to the flange or lug 30 of the side frame by a bolt 38. The key is generally horizontally elongated and extends from the flange 30 of inner leg 10 of the side frame inwardly and partially across bearing receiving opening 12 defined by walls 6, 14 and 16. The projection of the key across this opening is shown to be sufficient to prevent the cartridge bearing 24 from becoming totally separated from the side frame as the result of a partial separation of the bearing 24 from the wide adapter 18 through some unintended movement up or down of the pedestal side frame. The cartridge bearing 24, which can be other than a cartridge type bearing, rotatably supports the wheel and axle (not shown) of the freight car and supports the weight of the freight car through the truck and pedestal side side frame which rest upon the bearing, axle and wheel assembly. There is, however, no physical connection of the bearing, axle and wheel assembly to the pedestal side frame 2 to prevent the assembly from separating from the side frame during a derailment or other period of movement wherein the body 4 of the pedestal side frame is permitted to move relative to the bearing, axle and wheel assembly. The side frame key or retainer 32 acts at a time of separation of the assembly from the side frame to retain the assembly within the bearing receiving opening or jaw 12 and to prevent the total separation of the bearing 24, axle and wheel assembly from the side frame; the severe damage of the freight car; and the great cost and effort required to move the car once the total separation has occurred.

Figure 4:
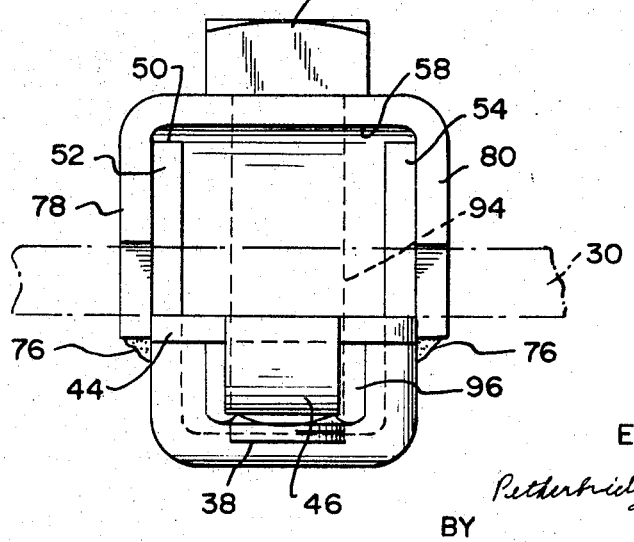
FIG. 4 is a cross-sectional view of the key of FIG. 2 taken along lines 3—3 thereof.
Figure 2:
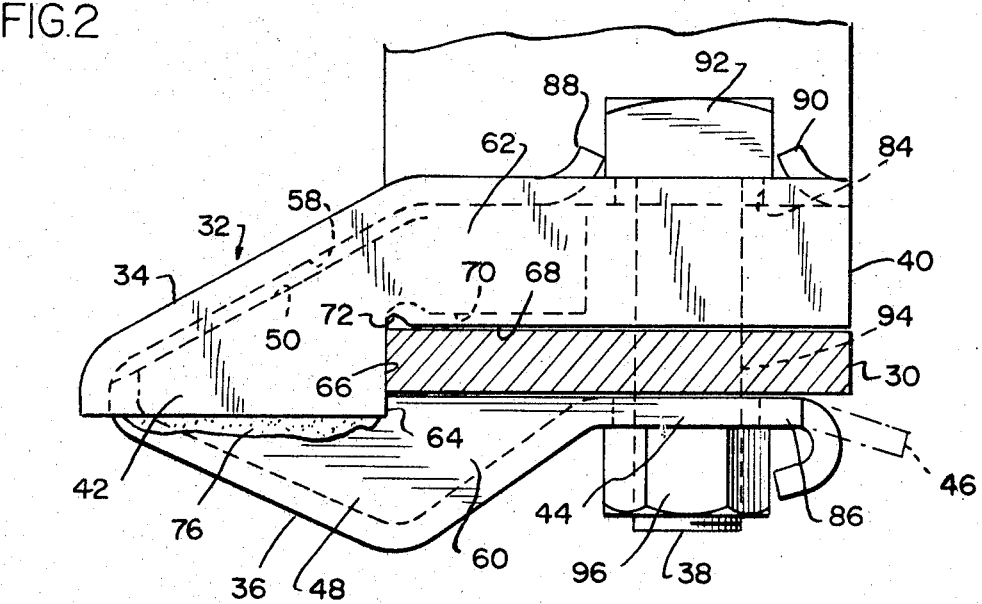
FIG. 2 is an enlarged side elevation of the key of FIG. 1.

The enlarged side elevational view of the frame key or retainer 32 more clearly illustrates the two-piece constuction of this embodiment of the key. FIG. 4 shows that the top and bottom parts 34 and 36 of the key 32 are formed with generally U-shaped cross-sectional configurations. The top part 34 is shown in FIG. 2 to consist of a generally rectangular appearing channel portion 40 and, in side elevation, an enlarged triangular portion 42. The top plan view of FIG. 3 shows that the plan appearance of both the top and bottom parts 34 and 36 remains generally rectangular.

The bottom part 36, as shown in FIG. 2, consists of a flat portion 44 which is designed to extend across the bolt receiving portion of flange 30 and includes a bendable tab member 46 at one extremity of the bottom part 36. The opposite end of bottom part 36, as can be best seen in FIG. 2, consists of a generally scoop-shaped portion which has a U-shaped cross-section as can be seen in FIG. 4 and with the upper surface of the side walls 52 and 54 and the front wall 56 complementing the configuration of top wall 58 of the top part 38 as shown in phantom in FIG. 2. The side walls 52 and 54 of the bottom part of the elongated hollow key 32 are formed with spaced apart legs 60 and 62 (FIG. 2) which span the bottom and top sides respectively of the flange 30. Adjacent surfaces 64 and 66 of the top and bottom parts, respectively, abut flange 30 as shown in FIG. 2. The point at which surfaces 64 and 66 join surfaces 68 and 70 of the top and bottom parts respectively are provided with curved surfaces 72 and 74, as shown in FIG. 2, which are designed to strengthen and reduce stress loading which would normally occur if sharp corners were employed.

It has been found to be desirable to weld top part 34 and bottom part 36 together along line 76 thereby connecting side walls 52 and 54, as well as front wall 56 of bottom part 36 to side walls 78 and 80 and front wall 82 of top part 34 (shown in FIG. 2).

Figure 3:
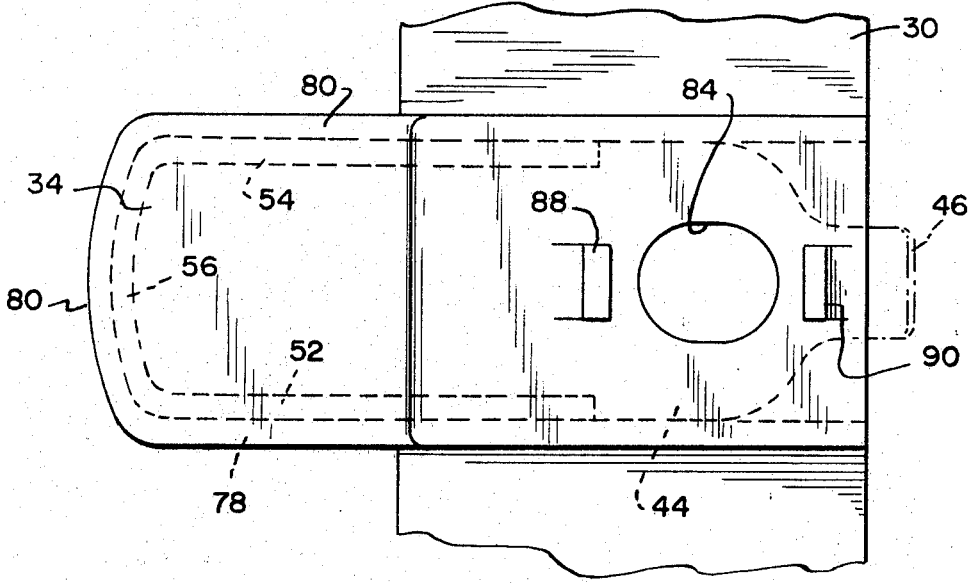
FIG. 3 is a top plan view of the key of FIG. 2.

As can be seen in FIGS. 2, 3 and 4, top part 34 of the key 32 is provided with a bolt opening 84 and the flat portion 44 on part 36 is provided with a bolt opening 86 positioned in generally vertical alignment with the bolt opening 84 of the top part. As is most clearly shown in FIGS. 2 and 3, tab portions 88 and 90 are formed adjacent to bolt opening 84 of the top part and spaced a distance therefrom sufficient to accommodate the head portion 92 of bolt 38 in a manner immobilizing the head 92 and preventing its rotation. These tabs are preferably formed integrally with the top part by striking them from the top part and bending them upwardly at an angle to be determined by the size of the bolt head 92 used in connecting the key 32 to the frame. The bolt 38 is passed through opening 84, a corresponding aligned opening 94 in flange 30, and finally through opening 86 of the bottom part of the key. At this point, bolt head 92 rests between tab portions 88 and 90 and is engaged by them in a manner preventing the location of the bolt head. A nut 96 is threaded onto the lower end of bolt 38 and tightened until the key 32 is rigidly secured to the flange 30 carried by the pedestal side frame 2. At this point, bendable tab portion 46 which extends from the extreme end of flat portion 44 of bottom part 36 is bent downwardly by suitable means into engagement with nut 96. This engagement of the tab portion 46 with the nut 96 prevents the relative rotation of the nut and bolt and thereby the loosening of nut 96 which can otherwise be frequently caused by the vibration and jarring of a freight car during periods of use.

Therefore, by producing the key or retainer of the embodiment of the invention illustrated in FIGS. 1–4 with a two-piece generally channel-shaped construction wherein the two pieces are welded together to provide a hollow integral key member which can be secured to a flange or lug or other suitable means provided on the side frame of a railroad car truck, it is possible to distribute the metal of the key farther away from the neutral axis of the key than was previously possible with one-piece forgings or steel castings. In this manner, greater strength can be obtained utilizing less weight. Also, the key of the invention includes integral portions which will prevent the loosening of securement nuts and bolts and the ultimate loss of the key or retainer from the side frame. And, the construction and design of the key of the invention is such that stress loadings produced by the impingement of the bearing 24, axle and wheel assembly upon the key 32 will be more evenly distributed by the key and primarily upon the flange 30 projecting from the side frame with a minimum of the stress being applied to the bolt 38. This acts to greatly reduce the danger of shearing caused by the prior art devices, and permits the key to perform reliably for an extended duration in preventing the accidental separation of the bearing, axle and wheel assembly from the side frame of a freight car truck.

The construction of modified frame key or retainer 100 is illustrated with clarity in FIG. 5. FIGS 6 and 7 show the key 100 is formed with a generally U-shaped cross sectional configuration. The frame key 100 is shown in FIG. 5 to consist of a pair of generally rectangular appearing channel portions 108 and 110, respectively, and, as seen in side elevation, na enlarged triangular portion 112. The top plan view of FIG. 6 shows that the plan appearance of the frame key 100 is generally rectangular.

The modified embodiment of the frame key or retainer 100 illustrated in FIGS. 5. 6 and 7 is shown to be fabricated as a generally box-shaped member 102. This frame key is shown to be secured to the flange or lug 30, a railroad car side frame, generally designed 2, by a bolt 106. The key is generally elongated in the horizontal direction and extends from the flange 30 of the side frame inwardly and partially across a bearing receiving opening such as is defined by walls 6, 14 and 16 in FIG. 1. The projection of the key across this opening is sufficient to prevent the cartridge bearing from becoming totally separated from the side frame.

Therefore, by producing the box or channel shaped key or retainer of the embodiment of the invention illustrated in FIGS. 5–7 to provide a one-piece hollow integral key member which can be essentially permanently secured to a flange or lug or other suitable means provided on the side frame of a railroad car truck, it is possible to distribute the metal of the key farther away from the neutral axis of the key than was previously possible with solid forgings or stel castings. In this manner, greater strength can be obtained utilizing less weight.

Also, the frame key 100 of the invention includes a bolt abutment surface 114 between rectangular portions 108 and 110 which will prevent the rotation of bolt heads, such as 116, and loosening of bolts with the ultimate loss or the key or retainer from the side frame. And, the construction and design of the key of the invention is such that stress loadings produced by the impingement of the wheel bearing, axle and wheel assembly upon the key 100 will be more evenly distributed by the key and primarily upon the flange 30 projecting from the side frame with a minimum of the stress being applied to the frame key securement bolt. This acts to greatly reduce the danger of shearing caused by the prior art devices, and permits the key to perform reliably for an extended duration in preventing the accidental separation of the bearing, axle and wheel assembly from the side frame of a freight car truck.

Various modes of carrying out the invention are contemplated as being within the scope of the following claims, particularly pointing out and distinctly claiming the subject matter which is regarded as the invention.

I claim:

1. A frame key for the side frame of a vehicular having an unsupported axle and bearing assembly, comprising a hollow elongated box member connectible to a side frame in cantilevered retaining relationship with respect to the axle and bearing assembly to retain the assembly with the side frame, and means on the box member for securing the box member to the side frame in a predetermined cantilevered relationship with respect to the axle and bearing assembly.

2. The frame key of claim 1, wherein the box member is provided with receiving and integral locking means on first side thereof and an integral bolt locking means and is provided with receiving and integral locking means on a second side thereof for receiving and locking the securement bolt adjacent the second side.

3. The frame key of claim 2, wherein the first side is the top of the box member and the second side is the bottom of the box member and wherein a securement bolt can be inserted into the receiving means of the top and bottom box members and the locking means of the top and bottom can act to lock the head and the nut portions of such a bolt against relative rotation after the box member has been secured to the side frame.

4. The frame key of claim 3, wherein the bolt receiving means comprise generally aligned openings in the top and bottom sides of the box elements and the locking means comprise integral tab elements disposed adjacent the openings for engagement with the head and nut portions of a bolt to prevent their relative rotation.

5. The frame key of claim 4, wherein one of the tab elements is initially displaced from the bolt receiving openings to permit initial securement of the box element to the side frame and the subsequent movement of the tab element into locking relationship with respect to one of the bolt portions.

6. The frame key of claim 1, wherein the box member comprises a first elongated box element, a second elongated box element complementing and assembled to the first elongated box element and means securing the first and second box elements.

7. The frame key of claim 6, wherein the first box element is formed with a U-shaped cross-sectional configuration, the second box element is formed with a U-shaped cross-sectional configuration having a dimension between the legs of the U smaller than the corresponding dimension of the first box element, the first box element being assembled to the second box element in overlapping relationship with respect to portions thereof.

8. The frame key of claim 6, wherein means are provided between the first and second assembled box elements for mounting the box member on a vehicle side frame and means are provided on the box member for securing the box member to the side frame and for maintaining the securement with the side frame.

9. The frame key of claim 8, wherein the means on the box member for securing the box member to a vehicle side frame comprise generally aligned openings therein disposed adjacent one end of the elongated box member.

10. The frame key of claim 9, wherein the end portion of the box member opposite that having the openings is tapered in a manner such that complementing portions of the first and second box elements converge towards each other to provide a common vertex which is spaced a greater distance from the openings than the opposite end of the box member to which they are also adjacent.

11. The frame key of claim 1 wherein the box member is formed with an integral one-piece construction and having an open end portion, the box member having a top wall having a generally rectangular plan configuration interconnecting substantial parallel side walls each having a side elevational configuration defining a first axially elongated generally rectangular portion, a second stepped generally rectangular portion, and a generally triangular portion extending from the upper extremity of the stepped rectangular portion outwardly and downwardly therefrom below the lower level of the rectangular portions.

12. The frame key of claim 11 wherein the means on the box member for securing the box member to a side frame in predetermined relationship with respect to the axle and bearing assembly thereof comprise an opening formed in the top wall of the box member adjacent the portion thereof interconnecting the first and second rectangular side wall portions, the opening being adopted to receive a securement bolt therethrough wherein the head portion thereof can be disposed in engagement with a surface of the box member to prevent the rotation of the bolt relative to the box member.

13. The frame key of claim 11 wherein the box member includes a closed construction on five sides thereof.

14. In a pedestal-type side frame having a downwardly opening bearing and axle receiving opening bounded at the sides thereof by downwardly extending inner and outer legs having opposed inner walls connected by a top wall, the improvement comprising a frame key mounting means provided on the side frame adjacent the lower portion of one of the legs and a hollow elongated box member secured to the mounting means, the elongated box member being mounted to the mounting means with its longitudinal axis extending across the bearing and axle receiving openings, the box member projecting into and partially closing the bearing and axle receiving openings provided by the top wall and inner walls of the legs to prevent the dislodgement of a bearing and axle assembly from the pedestal by the relative elevation of the pedestal with respect to a bearing and axle assembly.

15. The pedestal side frame of claim 14, wherein the box member includes a first box element, a second box element complementing and assembled to the first box element, means securing the first and second box elements, mounting means are provided on the box member for mounting the box member on the side frame mounting means, and means are provided for securing the box member to the side frame.

16. The pedestal side frame of claim 15 wherein the means for securing the box member to the side frame includes a bolt having a head at one end and a nut threaded to the opposite end; the box member mounting means includes generally aligned bolt receiving openings on opposite sides of the box member; the frame key mounting means includes an opening in the side frame for receipt of the bolt and alignment with openings in the box member; and the box member is secured to the side frame by passing the bolt through the box member and side frame openings and securing the assembly by a nut in a manner such that the greater portion of the box member projects into the opening between the lower portion of the inner wall of the pedestal legs a distance sufficient to prevent the accidental dislodgement of the bearing and axle assembly from the pedestal side frame.

17. The pedestal side frame of claim 16, wherein the frame key mounting means comprises a flange having an opening, the box member is bolted to the flange adjacent an end of the box member with the opposite end thereof projecting into the opening between the inner walls of the pedestal legs, the box member being provided with an integrally formed locking means thereon for preventing movement of the bolt and an integrally formed tab means adjacent a bolt receiving opening which can be moved into locking contact with the nut of the bolt subsequent to the securement of the assembly to the side frame to prevent relative movement of the nut and bolt during the operation of the pedestal side frame.

18. The pedestal side frame of claim 14 wherein the side and top wall portions of the box member form an enclosure open from the bottom thereof.

References Cited

UNITED STATES PATENTS

| 2,234,413 | 3/1941 | Orr | 105—221 |
| 2,424,327 | 7/1947 | Nystrom et al. | 105—221 |
| 3,211,112 | 10/1965 | Baker | 105—224.1 |
| 3,302,589 | 2/1967 | Williams | 105—224 X |

FOREIGN PATENTS

| 142,681 | 3/1961 | USSR. | |

ARTHUR L. LA POINT, Primary Examiner

H. BELTRAN, Assistant Examiner

U.S. Cl. X.R.

105—224; 308—38, 79, 180

UNITED STATES PATENT OFFICE
CERTIFICATE OF CORRECTION

Patent No. 3,521,570                                                July 21, 1970

Erwin J. Hasten, Jr.

It is certified that error appears in the above identified patent and that said Letters Patent are hereby corrected as shown below:

Column 1, line 28, "Frame Key for Pedestal Side Frame, now abandoned" should read -- Frame Key for Pedestal Side Frane --. Column 2, line 60, "illustartes a fregmentary" should read -- illustrates a fragmentary --. Column 3, line 42, "and pedestal side side frame which rest upon the bearing," should read -- and pedestal side frame which rest upon the bearing, --; line 75, "surface" should read -- surfaces --. Column 4, line 38, "location" should read -- rotation --. Column 5, line 7, "na" should read -- an --; line 12, after "FIG. 5" insert a comma; line 31, "stel" should read -- steel --; line 55, "vehicular" should read -- vehicle --; line 65, "is provided with receiving and integral locking means on" should read -- is provided with securement bolt receiving means on --; line 75, "top and bottom can act to lock the head and the nut" should read -- top and bottom can act to lock the head and nut --. Column 7, line 7, "openings" should read -- opening --.

Signed and sealed this 16th day of March 1971.

(SEAL)
Attest:

EDWARD M. FLETCHER, JR.                          WILLIAM E. SCHUYLER, JR.
Attesting Officer                                      Commissioner of Patents